US012141489B1

(12) United States Patent
Chapman

(10) Patent No.: US 12,141,489 B1
(45) Date of Patent: Nov. 12, 2024

(54) DEFERRED MEDIA TRANSFORM IN USER SPACE

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/138,474

(22) Filed: Apr. 24, 2023

(51) Int. Cl.
*G06F 3/12* (2006.01)

(52) U.S. Cl.
CPC .......... *G06F 3/1245* (2013.01); *G06F 3/1204* (2013.01); *G06F 3/1256* (2013.01)

(58) Field of Classification Search
None
See application file for complete search history.

(56) References Cited

U.S. PATENT DOCUMENTS

| | | | |
|---|---|---|---|
| 8,244,070 B2 | 8/2012 | Chapman et al. | |
| 8,570,553 B2 | 10/2013 | Morales | |
| 8,823,970 B2 | 9/2014 | Morales et al. | |
| 8,971,667 B2 | 3/2015 | Chao et al. | |
| 10,032,095 B2* | 7/2018 | Muthupandi | G06K 15/181 |
| 10,796,208 B1 | 10/2020 | Chapman | |
| 10,853,710 B2 | 12/2020 | Bozier | |
| 2008/0170262 A1* | 7/2008 | Takahashi | G06K 15/1809 358/1.15 |
| 2011/0047505 A1 | 2/2011 | Fillion et al. | |
| 2012/0300225 A1* | 11/2012 | Scrafford | G06K 15/186 358/1.2 |
| 2018/0011668 A1* | 1/2018 | Chai | G06F 3/1285 |
| 2019/0018631 A1* | 1/2019 | Shinohara | G06K 15/4065 |
| 2019/0255839 A1* | 8/2019 | Izawa | G06F 3/1211 |
| 2020/0189298 A1* | 6/2020 | Urlaub | H04N 1/00708 |
| 2021/0019099 A1* | 1/2021 | Ito | G06F 3/1244 |
| 2021/0117136 A1* | 4/2021 | Fujisawa | G06F 3/1285 |
| 2021/0334050 A1* | 10/2021 | Kohata | G06F 3/1257 |
| 2022/0083827 A1* | 3/2022 | Misawa | G06K 15/1809 |
| 2022/0169041 A1* | 6/2022 | Kayahara | B41J 11/008 |

OTHER PUBLICATIONS

"Page description language," Wikipedia, https://en.wikipedia.org/wiki/Page_description_language.
"Affine transformation," Wolfram MathWorld, https://mathworld.wolfram.com/AffineTransformation.html.
"Adobe JDF Solutions, Reliable JDF Job Ticketing with Adobe Creative Suite 2," 2005 Adobe Systems.

* cited by examiner

*Primary Examiner* — Helen Zong
(74) *Attorney, Agent, or Firm* — Ortiz & Lopez, PLLC; Kermit D. Lopez; Luis M. Ortiz

(57) ABSTRACT

Methods and systems for rendering a print job can involve saving an initial characteristic of a print job during a setup of the print job, comparing a current characteristic of the print job to the initial characteristic, and applying a transformation to compensate for a mismatch between the initial characteristic and the current characteristic prior to rendering of the print job. The print job is rendered after applying the transformation. The transformation may be performed in a vector space prior to marking of the print job in a device space.

17 Claims, 5 Drawing Sheets

DEFERRED MEDIA TRANSFORM IN USER SPACE

TECHNICAL FIELD

Embodiments are related to the field of digital printing including methods and systems for rendering print jobs. Embodiments are further related to devices, systems and techniques for the selection, formatting and rendering of media by digital printing. Embodiments further relate to methods and systems for preventing mismatches in media selection for print jobs.

BACKGROUND

In digital printing, a page description language (PDL) is a computer language that describes the appearance of a printed page in a higher level than an actual output bitmap (or generally raster graphics). An overlapping term is printer control language, which includes printer command language (PCL).

Some PDL interpreters employ a server loop which allows global information available to all jobs to be saved and then jobs are run within the loop. On a per job basis job tickets select feature of a print job such as media, plex, resolution or finishing. These may be used for the entire job or on a page-by-page basis. If there isn't any job ticket information defaults are used.

Any PDL may contain a job ticket via PJL (Printer Job Language) or PostScript or PCL (Printer Command Language) commands and will take precedence over the defaults if used. A conforming job may be setup in the following manner:

Global setup
Job Setup
Page 1 Setup
Checks
Page 1
Page 2 Setup
Checks
Page 2
Etc.

Job tickets may also be specified by a print driver, which prepends, for example, an XPIF ticket (note that XPIF is a Xerox proprietary format). Other examples include IPP and AirPrint. These take precedence over the PDL specified job tickets if used. If for example a resolution of 1200×1200 dpi was requested in Page 1 Setup, it can be checked in the Checks section and a determination made if it was honored before starting Page 1 content.

One issue with the above approach involves mismatching wherein when checking the page size after Page 1, Setup does not provide the page size used. In an example, the job may not have had a job ticket or media selection and the default media chosen which was A4. That is, the job layout and margins were set up for A4. Later, it was discovered that A4 was not loaded and letter size was used. Because letter is shorter and wider than A4, the bottom of the page rendered is clipped.

Another mismatch case is when the job has been converted to image pixels and for example runs out of media and the operator selects an alternate size media. While applying a transform in image space has its own set of problems.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide methods and systems for rendering a print job.

It is another aspect of the embodiments to provide methods and systems for transforming the size of a print jobs after the job has been interpreted, and which might have resulted in clipping or other alterations in the case of a media size change.

The aforementioned aspects and other objectives and advantages can now be achieved as described herein. In an embodiment, a method for rendering a print job can involve saving an initial characteristic of a print job during a setup of the print job, comparing a current characteristic of the print job to the initial characteristic, and applying a transformation to compensate for a mismatch between the initial characteristic and the current characteristic prior to rendering of the print job.

In an embodiment, the print job may be rendered after applying the transformation.

An embodiment can further involve performing the transformation in a vector space prior to marking of the print job in a device space.

In an embodiment, the transformation may comprise an affine transformation.

An embodiment can further involve deferring a media selection for the print job.

An embodiment can further involve ignoring a current characteristic of the media selection of the print job.

An embodiment can further involve deferring a media selection for the print job and ignoring a current characteristic of the media selection of the print job.

In an embodiment, the initial characteristic of the print job can comprise an initial page size of the print job.

In an embodiment, the current characteristic of the print job can comprise a current page size of the print job.

In an embodiment, a method for rendering a print job, can involve saving an initial page size of a print job during a setup of the print job, deferring a media selection for the print job, ignoring a current page size for the media selection, comparing the current page size used to the initial page size, and applying a transformation to compensate for a mismatch between the initial page size and the current page size.

In an embodiment, a system for rendering a print job, can include a memory, a storage medium for storing data, and a processor in communication with the storage medium and the memory, the processor executing machine readable instructions for: saving an initial characteristic of a print job during a setup of the print job; comparing a current characteristic of the print job to the initial characteristic; and applying a transformation to compensate for a mismatch between the initial characteristic and the current characteristic prior to rendering of the print job.

An embodiment of the system may further include a printer for rendering the print job after applying the transformation.

In an embodiment of the system, the transformation can be performed in a vector space prior to marking of the print job in a device space.

In an embodiment of the system, the transformation may be an affine transformation.

In an embodiment of the system, the processor can further execute machine readable instructions for deferring a media selection for the print job.

In an embodiment of the system, the processor can further execute machine readable instructions for ignoring a current characteristic of the media selection of the print job.

In an embodiment of the system, the processor can further execute machine readable instructions for deferring a media selection for the print job and ignoring a current characteristic of the media selection of the print job.

In an embodiment of the system, the initial characteristic of the print job can comprise an initial page size of the print job, and the current characteristic of the print job can be a current page size of the print job.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

Figure 1:
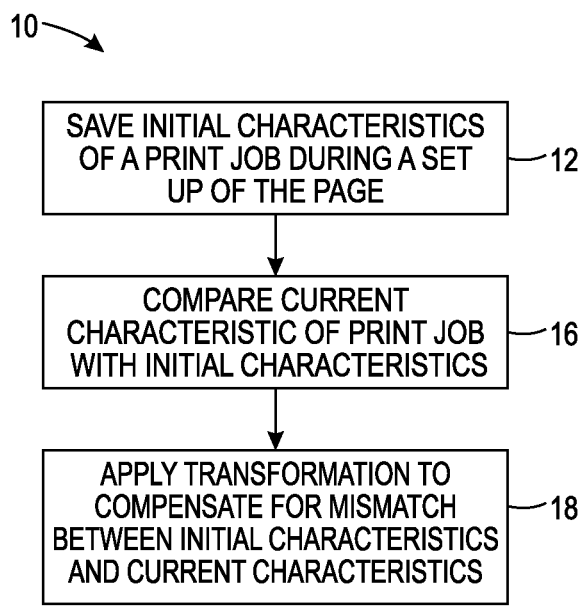
FIG. 1 illustrates a flow chart of operations depicting logical operational steps of a method for rendering a print job, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" as used herein can relate to physical signals that indicate or include information. The term "image" as used herein can relate to a pattern of physical light or a collection of data representing the physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein can relate to the term "segment" and may be employed herein interchangeably.

In a digital image composed of data representing physical light, each element of data may be called a "pixel," which is common usage in the art and can refer to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "job" and "print job" may be utilized interchangeably to refer to the same feature and can relate to a set of rendering instructions that can be sent from a computer, data-processing system, or other digital device to a rendering device such as printer, specifying what content to print, how many copies to make, what type of paper or other media to use, and other formatting and layout options. A print job, for example, may include text, images, graphics, or other types of content, and may be initiated by a user or generated automatically by a software program. Once the print job has been sent to the printer, the printer processes the instructions and creates a hard copy of the document or image.

The term "interpreter" as utilized herein and in the context of printing and rendering can relate to "interpreting," which can refer to the process of translating the data and commands in a document into instructions that a printer can understand and execute. When one prints a document, the computer sends the data to a printer in a specific format, such as PostScript or PCL (Printer Command Language). The printer can then "interpret" this data and convert it into a series of commands that can control the printing process, such as how the text and graphics should be arranged on the page, what font should be used, and how much ink or toner to apply.

In page setup and printing, interpreting is an important step because it ensures that the final printed document looks exactly as it should, with accurate colors, fonts, and layout. Different printers may require different interpretations, depending on their make and model, so it is important to select the correct printer driver when setting up a print job.

As discussed in the background section, most PDL (Page Description Language) jobs such as PostScript, PCL and PDF select media based on job tickets, embedded commands, or defaults. These are normally set up early or prior to the page marking commands. There are some jobs that perform a media substitution later in the job which can cause clipping, misalignments, or other issues.

Embodiments are thus related to methods, systems and devices for transforming the size of a print job after the job is interpreted, and which might have resulted in clipping or other alterations in the case of a media size change. This approach prevents clippings, misalignments, or other issues in the rendering of a print job.

A novel method and system is disclosed wherein the media size can be recorded and the job (e.g., a print job) interpreted and converted in a sequence of, for example, PS->SL->DL (PostScript, source list, display list) which is a primitive vector graphics format. Note that SL (source list) or DL (display list) are intermediate formats between higher level PDL and raster, wherein parameters can be set, such as max size. It should be appreciated, of course, that the aforementioned sequence is mentioned herein for exemplary and illustrative purposes only and should not be a considered a limiting feature of the embodiments. Other types of sequences are possible. The restructuring of the operations used during the rendering phase results in a more efficient process from a computing perspective. This approach allows jobs to be printed that otherwise would have been clipped.

Note that some PDL's can have an interpretive (user space) thread and one or more rendering (device space) threads. The rendering thread(s) can run in parallel to the interpretive thread. A CTM (current transformation matrix) can define the mapping between user space and device space. When something is done in user space such as scaling from A4 to letter, the CTM can be modified but nothing is actually scaled yet. When it is converted to device space, the scaling can be accomplished along with any other changes to the CTM. Setting the deferred media and 'ignore page size' in the media selection can thus delay kicking off rendering threads, thereby allowing for a later change of media size.

FIG. 1 illustrates a flow chart of operations depicting logical operational steps of a method 10 for rendering a print job, in accordance with an embodiment. The method 10 can be utilized to implement operations of a deferred media transform when rendering the print job.

As indicated a block 12, a step or operation can be implemented to save an initial characteristic (e.g., a page size) of a page during a setup of the page. Next, as shown at block 16, a step or operation can be implemented to compare the current characteristic of the print job to the initial characteristic of the print job. Thereafter, as shown at block 18, a step or operation can be implemented to apply a transformation to compensate for a mismatch between the initial characteristic and the current characteristic prior to rendering of the print job. Note that the transformation indicated with respect to the operation depicted at block 18 can be performed in a vector space prior to marking of the print job in a device space.

Figure 2:
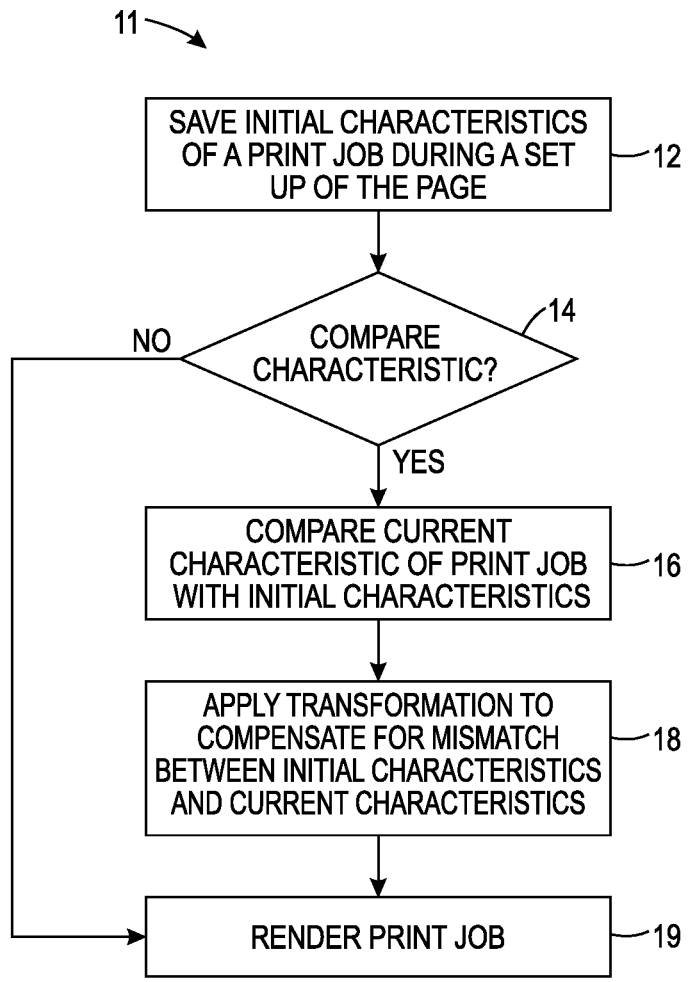
FIG. 2 illustrates a flow chart of operations depicting logical operational steps of a method for rendering a print job including a step or rendering the print job, in accordance with an embodiment.

FIG. 2 illustrates a flow chart of operations depicting logical operational steps of a method 11 for rendering a print job including a step or rendering the print job, in accordance with an embodiment. Note that the operations of method 11 shown in FIG. 2 are similar to those depicted in FIG. 1 with the addition of a step or operation for rending the print job, as shown at block 19, and a Boolean decision operation for comparing the characteristics of the print job. That is, block 14 is a decision block representing an operation wherein if a decision is made to implement the comparison operation, then the processes beginning with those depicted at block 16 are implemented. If not, then the print job is immediately rendered, as shown at block 19.

Figure 3:
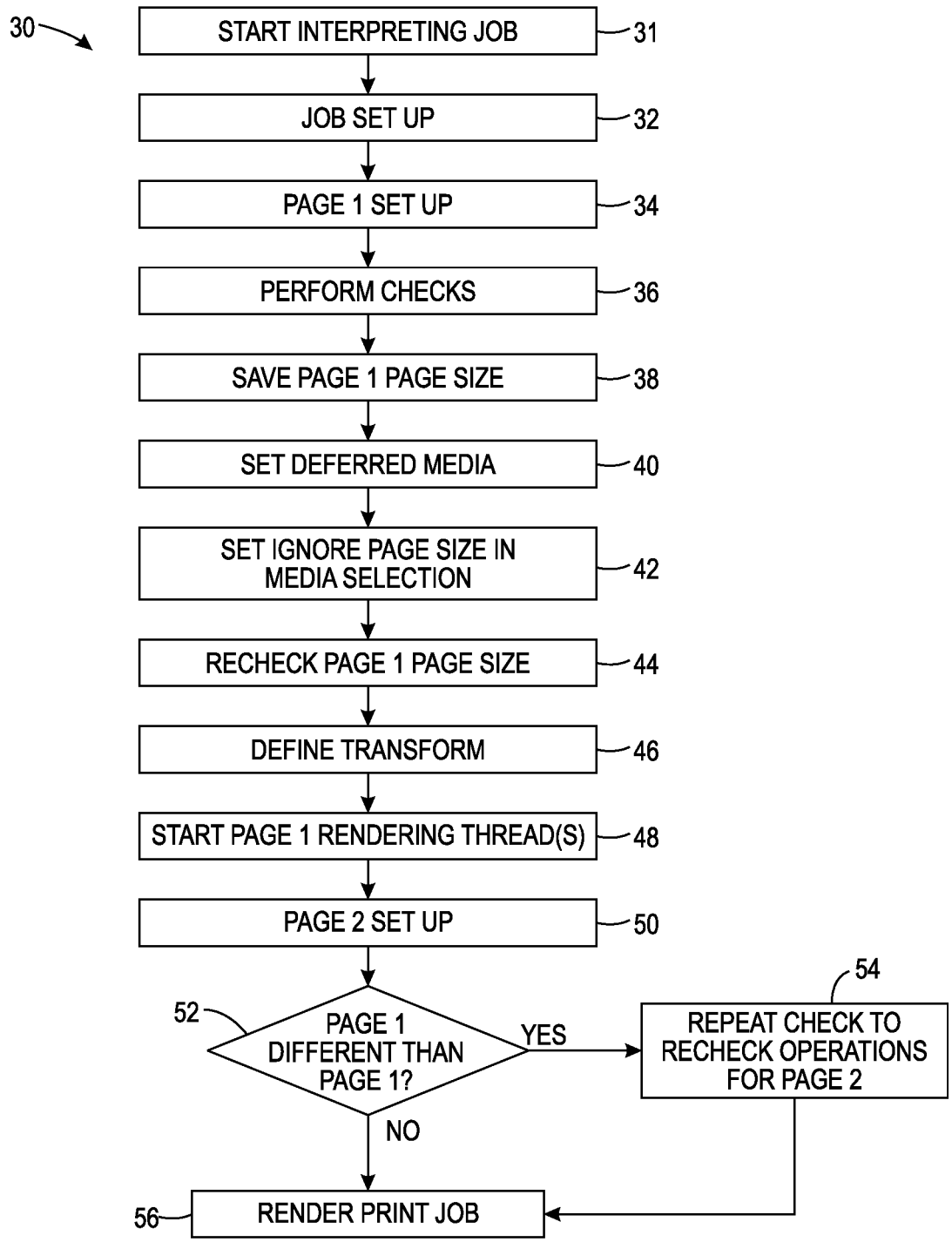
FIG. 3 illustrates a flow chart of operation depicting logical operational steps of a method for subjecting a print job to a transformation to account for any mismatches in media selection, in accordance with an embodiment.

FIG. 3 illustrates a flow chart of operation depicting logical operational steps of a method 30 for subjecting a print job to a transformation to account for any mismatches in media selection, in accordance with an embodiment. As shown at block 31, a step or operation can be implemented to start interpreting a print job. Then, as shown at block 32, a step or operation can be implement involving the job (i.e., a print job) setup. Next, as shown at block 34, Page 1 of the job can be setup. Then, as shown at block 36, a step or operation can be performed to check the Page 1 setup.

Thereafter, as indicated at block 38, a step or operation can be implemented save the page size of Page 1 of the print job. Then, as indicated at block 40, a step or operation can be implemented to set 'deferred media' with respect to Page 1. Next, as shown at block 42, a step or operation can be implemented to set 'ignore Page Size" in the media selection of the print job. The 'ignoring' operation indicated at block 42 can involves instructing an interpreter to ignore the page size in the media selection process. Next, as shown at block 44, a step or operation can be implemented to recheck the page size of Page 1.

Thereafter, a step or operation can be implemented as indicated at block 46 to define a transformation based on the operations performed with respect to block 38 ("Save Page 1 page size") and block 44 ("Recheck Page 1 page size). Note that the transformation may be executed in user (vector) space. As shown at block 48, a step or operation can be implemented to start rendering thread(s) (recall the earlier discussion regarding thread(s)).

Next, as illustrated at block 50, a step or operation can be implemented to set up Page 2. Thereafter, as depicted at decision block 52, a step or operation can be implemented to determine if the Page 2 setup is different than the Page 1 setup. If so, then the step or operations depicted at blocks 36 to 44 can be repeated with. Following repeating of these operations, the print job can be then rendered as shown at block 56. Alternatively, if these operations are not repeated, then assuming a "No" answer with respect to decision block 52, the print job is rendered as shown at block 56.

The operations of method 30 shown in FIG. 3 can also be summarized as follows:
1) Job Setup
2) Page 1 Setup
3) Checks 4) Save Page 1 Page Size
5) Set Deferred Media
6) Set ignore Page Size in Media selection
7) Recheck Page 1 Page Size
8) Define transform based on steps 4 and 7 and execute in user (vector) space
9) Page 1
10) Page 2 Setup
11) If Page 2 Setup different than Page 1 perform steps 3-7 for Page 2
12) Page 2
13) Etc.

Step 4 is new as the Page Size normally does not change except during Setup. Steps 5 and 6 ensure that even if the Page Size is set in Setup eventually the Page Size actually used will be returned. Step 8 transforms the page from the original page size to the new one.

A matrix transformation can be used for the transformation as follows:

$$[abcdtxty] =$$
$$|ab0|$$
$$|cd0|$$
$$|txty1|$$
$$x' = ax + cy + tx$$
$$y' = bx + dy + ty$$
$$\text{Translation} =$$
$$|100|$$
$$|010|$$
$$|txty1|$$
$$\text{Scale} =$$
$$|Sx00|$$
$$|0Sy0|$$
$$|001|$$
$$\text{Rotate } ccw \text{ around origin}$$
$$|\cos@\sin@0|$$
$$|-\sin@\cos@0|$$
$$|001|$$

For the example of A4/Letter, one such transform may be to scale the X and Y coordinates such that Sx=612/595 and Sy=792/845. This can ensure all content fits but changes the aspect ratio. Another option is to shrink both e.g., Sx=Sy 792/845, which keeps the correct aspect ratio. Yet another option is to center where tx=(595-612)/2 and ty=(845-792)/2. More complex transforms may be performed. It should be appreciated that these transformations are discussed for illustrative and exemplary purposes only and should not be considered limiting features of the embodiments.

It should be appreciated that the methods 10, 11 and 30 discussed herein with respect to FIGS. 1-3 involve operations/instructions in which when setting up the job, the initial page size is initially saved. The media selection can be then set to a deferred mode and an interpreter can be instructed to ignore the page size in the media selection process. Later in the job the page size used is compared to the initial page size. For the cases where they do not match an affine transform can be applied to compensate for the mismatch. This feature can be implemented as part of the transformation operations shown at block 18 in FIGS. 1-2 and at block 46 in FIG. 3. This can be performed in user (vector) space prior to marking in device space.

Figure 4:
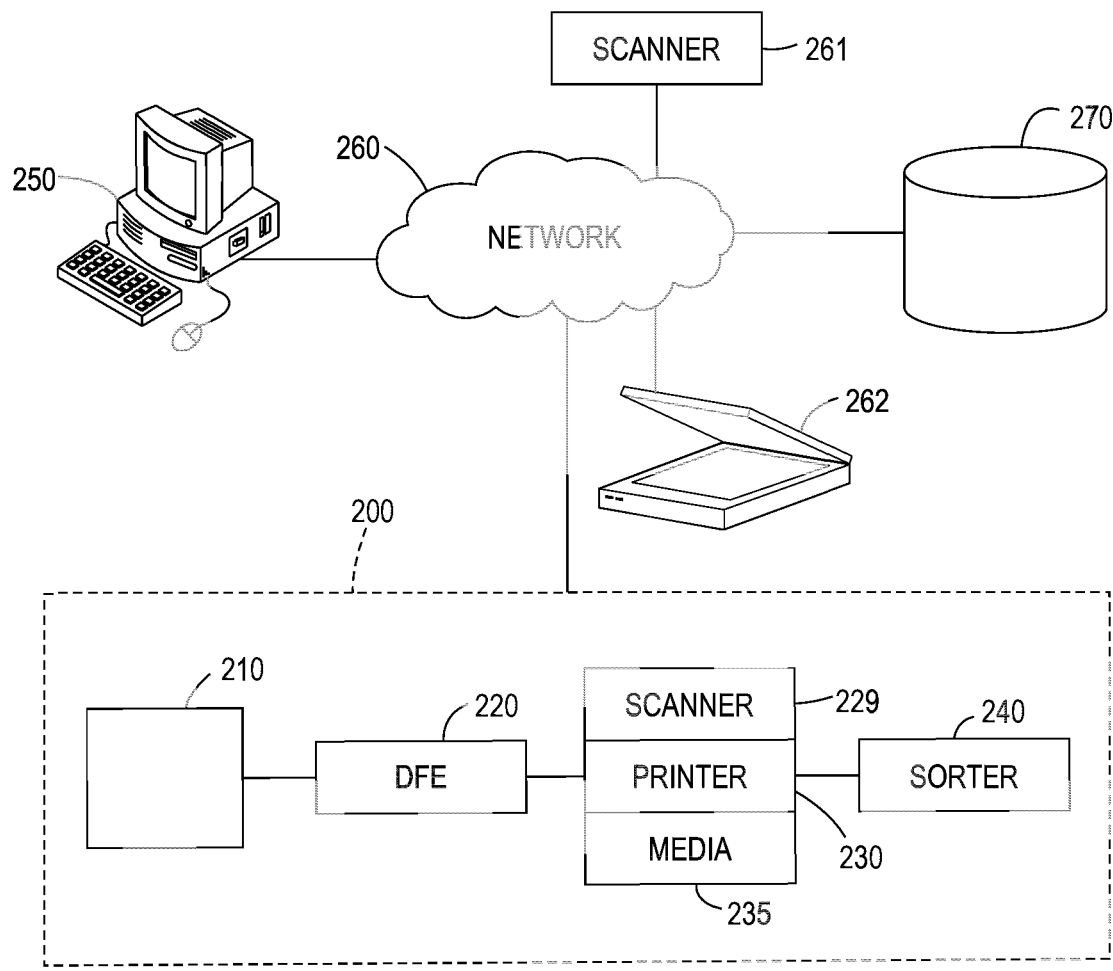
FIG. 4 illustrates a block diagram of a printing system suitable for implementing one or more of the disclosed embodiments.

With reference to FIG. 4, a printing system (or image rendering system) 200 may be suitable for implementing various aspects of the exemplary embodiments described herein is illustrated. In some embodiments, the printing system 200 can implement rendering operations such as scanning a document via a scanner and printing a document via a printer, wherein the document includes the disclosed two-layer correlation mark with a variable data hiding layer.

The printing system 200 may include a number of components such as a scanner 229 and a printer 230. Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. Other types of scanners, which may be utilized to implement scanner 229 include sheet-feed scanners.

The scanner 229 may in some cases be incorporated into a multi-function device (MFD), which also may possess printing and photocopying features. That is, the printing system 200 may be an MFD. The scanner 229 shown in FIG. 4 may form a part of the printing system 200. Alternatively, or in addition to the scanner 229 included as a part of the printing system 200, one or more separate scanners such as scanner 261 and scanner 262 may communicate with the printing system 200 through a data network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The term "scanner" as used herein can relate to a device and/or system that can capture images or documents and convert them into digital data that can be stored or manipulated in or by a computer. There are different types of scanners that can be used for different purposes. Some common types include flatbed scanners, sheet-fed scanners, drum scanners, and handheld scanners.

The printing system 200 can include a user interface 210, a digital front-end (DFE) controller 220, and one or more print engines associated with the printer 230. The print engine may access media 235 of various sizes and costs for a print job. In some embodiments, the printing system 200 may be a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. In some embodiments, one or more color sensors (not shown) may be embedded in the printer paper path associated with the printer 230.

Figure 5:
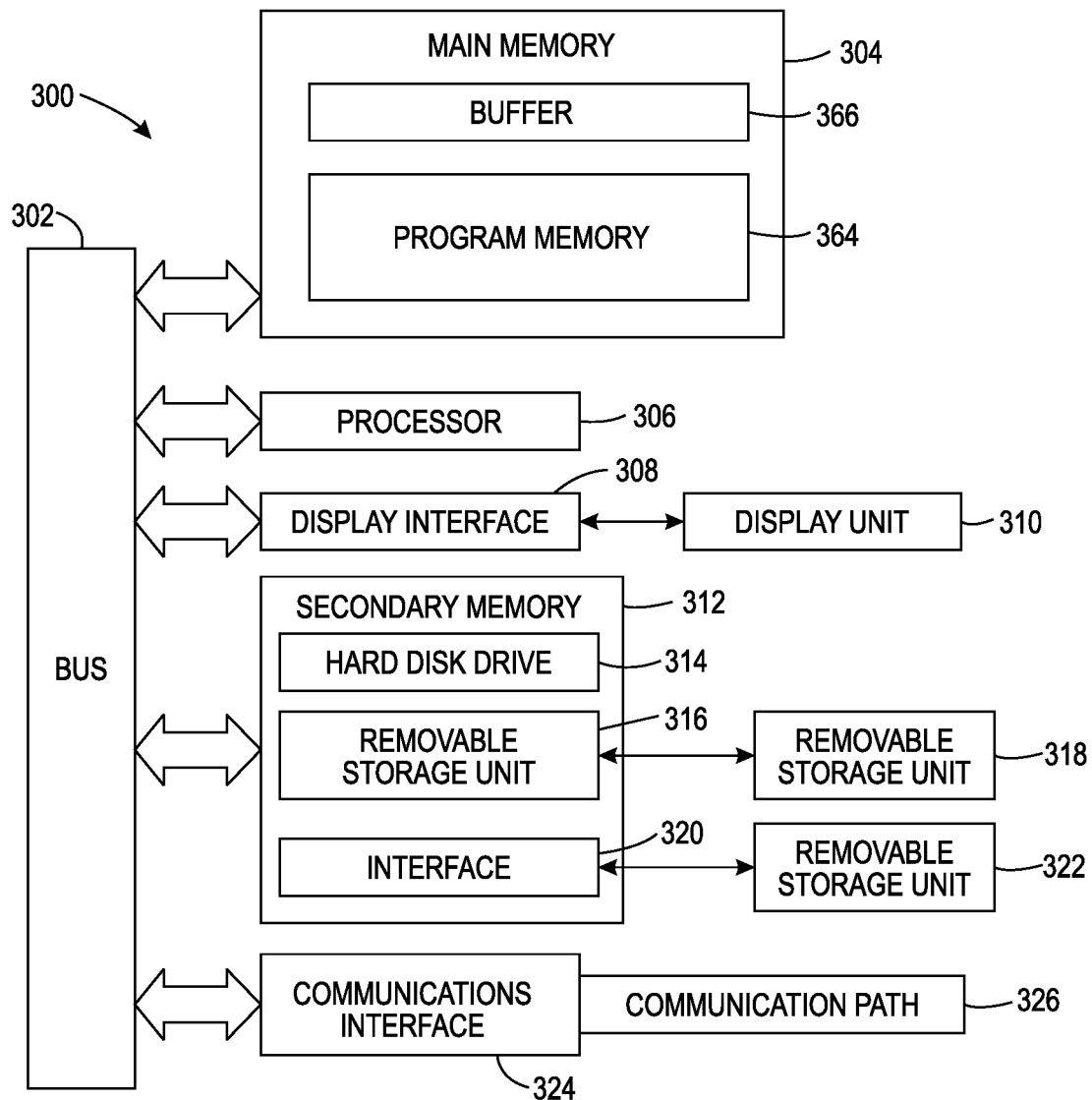
FIG. 5 illustrates a block diagram of a digital front-end controller useful for implementing one or more of the disclosed embodiments.

With respect to FIG. 5, an exemplary DFE (Digital Front End) controller 300 is shown in greater detail and may be utilized as or with the DFE controller 220 shown in FIG. 4. The DFE controller 300 shown in FIG. 5 can include one or more processors, such as processor 306 capable of executing machine executable program instructions. The processor 306 can function as a DFE processor.

In the embodiment shown in FIG. 5, the processor 306 can be in communication with a bus 302 (e.g., a backplane interface bus, cross-over bar, or data network). The DFE controller 300 depicted in FIG. 5 can also include a main memory 304 that can be used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The DFE controller 300 shown in FIG. 5 can include a display interface 308 that can forward data from a communication bus 302 (or from a frame buffer not shown) to a display 310. The DFE controller 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data. The UI 210 shown in FIG. 4 may be displayed as a graphical user interface (GUI) via, for example, the display 310 shown in FIG. 5.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can also include a communications interface 324, which can act as an input and an output to allow software and data to be transferred between the DFE controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks (e.g., such as the various steps/operations/instructions shown in the blocks in FIGS. 1-3 herein).

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 3 and/or the DFE controller 220 shown in FIG. 4.

A "module" can perform the various steps, operations or instructions discussed herein, such as the steps or operations discussed herein such as, for example, the steps, operations or instructions of method 10, method 11 and method 30.

The methods 10, 11, and 30 shown in FIGS. 1-3, for example, may be implemented, in part, in a computer program product comprising a module that may be executed by, for example, the DFE controller 220. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 4).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract features such as media (e.g., paper) which may be rendered via the printing system 200.

Based on the foregoing, it can be appreciated that a number of embodiments are disclosed herein including preferred and alternative embodiments. For example, an embodiment, a method for rendering a print job, can involve: saving an initial characteristic of a print job during a setup of the print job; comparing a current characteristic of the print job to the initial characteristic; and applying a transformation to compensate for a mismatch between the initial characteristic and the current characteristic prior to rendering of the print job.

An embodiment of the method can also involve rendering the print job after applying the transformation.

An embodiment of the method may further involve performing the transformation in a vector space prior to marking of the print job in a device space.

In an embodiment of the method, the transformation may comprise an affine transformation.

An embodiment of the method can also involve deferring a media selection for the print job.

An embodiment of the method may further involve ignoring a current characteristic of the media selection of the print job.

An embodiment of the method can also involve deferring a media selection for the print job and ignoring a current characteristic of the media selection of the print job.

In an embodiment of the method, the initial characteristic of the print job can comprise the initial page size of the print job.

In an embodiment of the method, the current characteristic of the print job can comprise the current page size of the print job.

In another embodiment, a method for rendering a print job, can involve: saving an initial page size of a print job during a setup of the print job; deferring a media selection for the print job; ignoring a current page size for the media selection; comparing the current page size used to the initial page size; and applying a transformation to compensate for a mismatch between the initial page size and the current page size.

In an embodiment, the transformation can be performed in a vector space prior to marking of the print job in a device space. In some embodiments, the transformation may be an affine transformation.

In another embodiment, a printing system can include a memory; a storage medium for storing data; and a processor in communication with the storage medium and the memory, the processor executing machine readable instructions for: saving an initial characteristic of a print job during a setup of the print job; comparing a current characteristic of the print job to the initial characteristic; and applying a transformation to compensate for a mismatch between the initial characteristic and the current characteristic prior to rendering of the print job.

An embodiment of the printing system can include a printer for rendering the print job after applying the transformation.

In an embodiment of the printing system, the transformation can be performed in a vector space prior to marking of the print job in a device space.

In an embodiment of the printing system, the transformation may be an affine transformation.

In an embodiment of the printing system, the processor can further execute machine readable instructions for: deferring a media selection for the print job.

In an embodiment of the printing system, the processor can further execute machine readable instructions for ignoring a current characteristic of the media selection of the print job.

In an embodiment of the printing system, the processor can further execute machine readable instructions for deferring a media selection for the print job and ignoring a current characteristic of the media selection of the print job.

In an embodiment of the printing system, the initial characteristic of the print job can comprise an initial page size of the print job, and the current characteristic of the print job can comprise a current page size of the print job.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a print job, comprising:
    saving an initial characteristic of a print job during a setup of the print job;
    comparing a current characteristic of the print job to the initial characteristic based on a Boolean decision;
    applying a transformation in vector space to compensate for a mismatch between the initial characteristic and the current characteristic prior to rendering of the print job, the transformation comprising a matrix transformation including a translation matrix, a scale matrix, and a rotation matrix involving rotation about an origin; and deferring a media selection for the print job.

2. The method of claim 1 further comprising rendering the print job after applying the transformation.

3. The method of claim 1 performing the transformation in the vector space prior to marking of the print job in a device space.

4. The method of claim 1 wherein the transformation comprises an affine transformation.

5. The method of claim 1 further comprising deferring a media selection for the print job.

6. The method of claim 1 further comprising ignoring with an interpreter, a current characteristic of the media selection of the print job.

7. The method of claim 1 wherein the initial characteristic of the print job comprises an initial page size of the print job.

8. The method of claim 1 wherein the current characteristic of the print job comprises a current page size of the print job.

9. A method for rendering a print job, comprising:
saving an initial page size of a print job during a setup of the print job;
deferring a media selection for the print job;
ignoring with an interpreter, a current page size for the media selection;
comparing the current page size used to the initial page size; and
applying a transformation to compensate for a mismatch between the initial page size and the current page size, the transformation comprising a matrix transformation including a translation matrix, a scale matrix, and a rotation matrix involving rotation about an origin.

10. The method of claim 9 performing the transformation in a vector space prior to marking of the print job in a device space.

11. The method of claim 9 wherein the transformation comprises an affine transformation.

12. A printing system, comprising:
a memory;
a storage medium for storing data; and
a processor in communication with the storage medium and the memory, the processor executing machine readable instructions for:
saving an initial characteristic of a print job during a setup of the print job;
comparing a current characteristic of the print job to the initial characteristic based on a Boolean decision;
applying a transformation in vector space to compensate for a mismatch between the initial characteristic and the current characteristic prior to rendering of the print job, the transformation comprising a matrix transformation including a translation matrix, a scale matrix, and a rotation matrix involving rotation about an origin; and
deferring a media selection for the print job.

13. The printing system of claim 12 further comprising a printer for rendering the print job after applying the transformation.

14. The printing system of claim 12 wherein the transformation is performed in the vector space prior to marking of the print job in a device space.

15. The printing system of claim 12 wherein the transformation comprises an affine transformation.

16. The printing system of claim 12 wherein the processor further executes machine readable instructions for:
ignoring with an interpreter a current characteristic of the media selection of the print job.

17. The printing system of claim 12 wherein:
the initial characteristic of the print job comprises an initial page size of the print job; and
the current characteristic of the print job comprises a current page size of the print job.

\* \* \* \* \*